R. DRESSMANN.
REAR GUARD FOR TRACTION CARS.
APPLICATION FILED NOV. 23, 1908.

944,082.

Patented Dec. 21, 1909.

Witnesses
Bessie A. Beall
Charles W. Hoffman

Inventor
Robert Dressmann
by Alfred M. Allen
Attorney

UNITED STATES PATENT OFFICE.

ROBERT DRESSMANN, OF COVINGTON, KENTUCKY, ASSIGNOR OF ONE-HALF TO CHARLES C. CARTER, OF CINCINNATI, OHIO.

REAR GUARD FOR TRACTION-CARS.

944,082.   Specification of Letters Patent.   Patented Dec. 21, 1909.

Application filed November 23, 1908. Serial No. 464,179.

*To all whom it may concern:*

Be it known that I, ROBERT DRESSMANN, a citizen of the United States, residing in Covington, county of Kenton, and State of Kentucky, have invented certain new and useful Rear Guards for Traction-Cars and the Like, of which the following is a full, clear, and exact description, reference being had to the accompanying drawings, forming part of this specification.

The object of my invention is to provide a guard for the rear end of traction cars, which shall give warning to any passenger alighting from the car that another car is approaching from the opposite direction, and to prevent such passenger from being struck by the approaching car in crossing the street behind the car from which he has just alighted.

The invention consists of a bar which is arranged to be projected from the rear end of the car, both to serve as a warning signal, and also to block the passage of any one immediately in the rear of the car, with mechanism for controlling and operating the guard so that the bar may be projected from the rear of the car by the action of the motor-man, only when he realizes that a car is approaching in the opposite direction, and liability of accident may be imminent, and in which under control of the motorman, the guard may be automatically drawn up underneath the car as soon as the danger is past, and the car starts on its forward course, the guard to be again automatically re-set so that it may be again projected when required.

Figure 1:
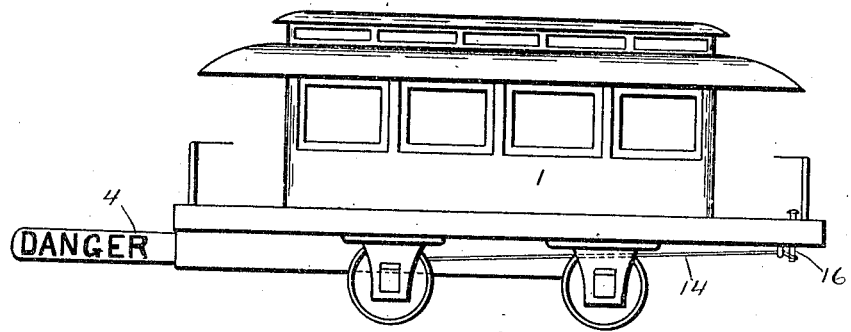
Figure 2:
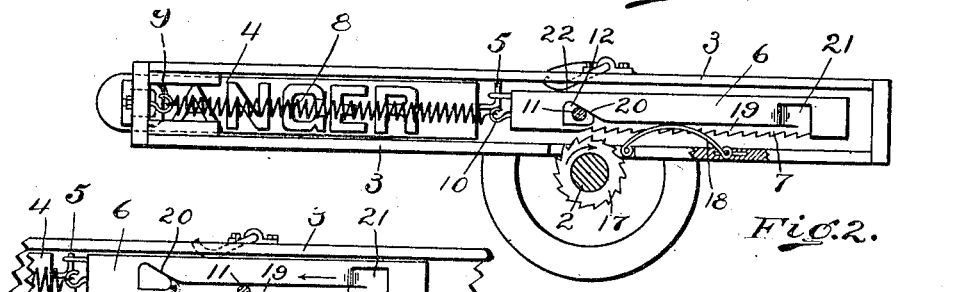
Figure 3:
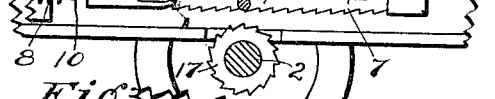
Figure 4:
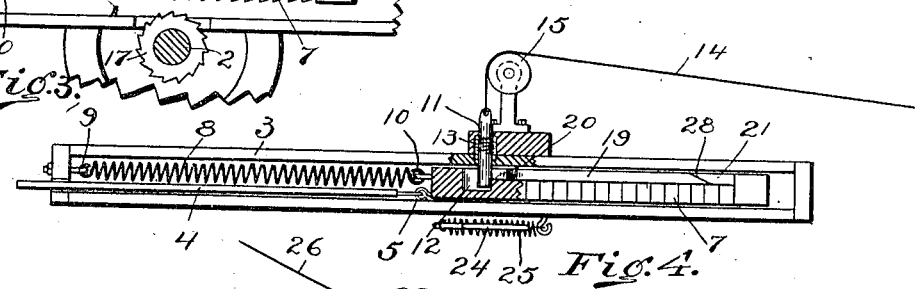
Figure 5:
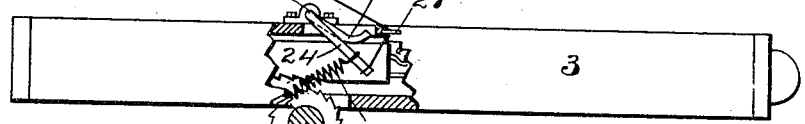
Figure 6:
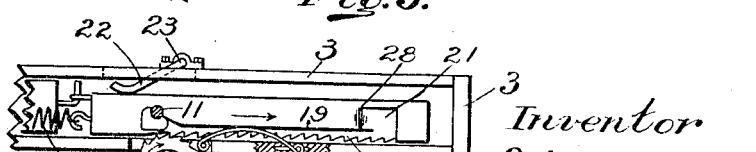

In the drawings Figure 1 is a side elevation of a traction car with my automatic rear guard attached. Fig. 2 is a side elevation of the operating mechanism when the guard is at rest in its position underneath the car. Fig. 3 is a similar view of a portion of the construction shown in Fig. 2, as the guard is being propelled from underneath the car. Fig. 4 is a bottom plan view partly in section of the operating mechanism. Fig. 5 is a side elevation partly in section of the side opposite that shown in Fig. 2, and Fig. 6 is a side elevation partly in section of the part shown in Fig. 2, as the guard is being automatically drawn back underneath the car.

Secured underneath the floor of the traction car 1 and above the axle 2 of the rear truck, is a casing 3 in which is mounted a bar 4, which is secured in any suitable way as by hook and eye 5, to a rack bar 6, provided with the rack teeth 7. The casing 3 extends beneath the rear platform of the car, and 8 is a coiled spring attached at one end 9, to the casing, and at the other end 10 to the rack bar 6, by which spring when the parts are released, the guard 4 will be projected rearwardly from underneath the rear platform. The guard is normally held at rest underneath the car by the pin 11, which engages the slot 12 in the side of the rack bar 6, the pin being mounted in the side of the casing, and normally held in engagement with the rack bar by the coiled spring 13.

As a convenient means for releasing the pin 11, I connect same by the flexible cord 14, running over the pulley 15, with the foot pin 16, which projects through the floor of the front platform in convenient position for the motorman, so that by depressing the foot pin 16, tension will be exerted on the flexible cord 14 to draw out the pin 11, and release the rack bar so that the coiled spring 8 will propel the bar 4 rearwardly from underneath the rear platform.

The slot 12 is located in such a position on the side of the rack bar, that when the pin 11 is in engagement with the slot, the rack bar will be held in elevated position, with the teeth of the rack bar out of engagement with the ratchet wheel 17, which is keyed or otherwise secured on the axle 2. A flat spring 18 mounted in the casing, is also provided to assist in holding the rack bar in elevated and horizontal position.

The lower horizontal edge of the rack bar is cut away as shown at 19, and when the pin 11 is withdrawn from the slot 12, and the rack bar is drawn rearwardly by the spring 8, the pin rides down the inclined surface 20 and along the groove 19 holding the rack bar elevated, as the guard is propelled from underneath the car as shown in Fig. 3. At the opposite end of the rack bar is another slot 21, and when the pin 11 reaches this slot, the rack bar will be depressed by the arm 22, which bears on the upper surface of the rack bar. This arm is pivoted at 23 on the casing, and is provided with a downwardly projecting arm 24, held under tension by the coiled spring 25, attached between the end of the arm 24, and the casing. 26 is a flexible cord connected with the outer end of this arm running through the eye 27, and connected at its forward end with the foot pin 16 so that when the motorman depresses the foot pin 16 he will raise the arm 22 from the rack bar, and as long as the motorman maintains his pressure on the foot pin, the rack bar even when it has reached the limit of its rearward throw, will still be held out of contact with the ratchet wheel 17, by the spring 18. The moment that the motorman releases the foot pin 16 and the same is returned to its normal position by a suitable spring, not shown, the coiled spring 25, which is a stronger spring than the flat spring 18, draws down the rack bar, causing the teeth thereof to engage the ratchet wheel 17. At the same time the pin 11 is carried to the upper end of the slot 21. As the car advances, the ratchet wheel 17 is rotated drawing back the rack and the rear guard to their normal positions underneath the car, and the pin 11 rides up the inclined surface 28, and bears against the side of the rack bar during its return.

The teeth of the rack bar are so arranged, as illustrated in Fig. 6, that just before the pin 11 reaches the slot 12, the teeth of the ratchet wheel will come in contact with the lower surface of the rack bar, and raise the same allowing the pin 11 to engage the slot 12, and the parts will be returned to their normal position, with the rack bar held disengaged from the ratchet wheel.

The operation of my automatic rear guard will be evident from the foregoing description.

Normally the guard is held in locked position by the pin 11, and the rack bar is disengaged from the ratchet wheel, and the car proceeds in its ordinary way. When the signal has been given to stop, in order to allow a passenger to alight, if the motorman perceives a car approaching which may be a source of danger, he depresses the foot pin 16. This releases the guard and allows it to be propelled rearwardly from the car, so as to prevent any one crossing behind the car. The word danger may be printed on the guard to call attention to the purpose thereof. As long as the motorman keeps the foot pin depressed, the guard will remain in its projected position, whether the car is running or at rest. The moment the motorman releases the foot pin, however, the rack bar will be thrown into engagement with the ratchet wheel as above described, and the forward movement of the car will carry the rack bar into its forward position, and allow it to be automatically locked by the pin 11 and with the rack bar the rear guard will be withdrawn underneath the car.

Having thus described my invention what I claim as new and desire to secure by Letters Patent, is:

1. In a traction car signaling device to be projected beyond the rear of the car, mechanism for normally retaining the device underneath the car, means for releasing the retaining mechanism under control of the motorman, spring for propelling the device from under the car body, rack to which the device is attached, and ratchet wheel to engage said rack and withdraw the device underneath the car.

2. In a traction car signaling device to be projected beyond the rear of the car, mechanism for normally retaining the device underneath the car, means for releasing the retaining mechanism under control of the motorman, spring for propelling the device from under the car body, ratchet wheel mounted on the car axle to rotate therewith, rack bar to which the signaling device is attached normally disengaged from the ratchet wheel, and means for throwing said bar and wheel into engagement with each other to withdraw the signaling device underneath the car body with the advance of the car.

3. In a traction car signaling device to be projected beyond the rear of the car, a retaining pin to hold the device underneath the car body, means for releasing the pin under control of the motorman, spring for propelling the device from under the car, ratchet wheel mounted on the car axle to rotate therewith, rack bar to which the signaling device is attached, provided with a slot engaged by the retaining pin to hold the rack bar out of engagement with the ratchet wheel, with spring arm to enforce such engagement, and connection for said spring arm with the rack bar releasing device whereby the spring arm may be disengaged simultaneously with the retaining pin.

ROBERT DRESSMANN.

Witnesses:
  R. P. HARGITT,
  BESSIE A. BEALL.